United States Patent
King et al.

(10) Patent No.: US 7,296,708 B2
(45) Date of Patent: Nov. 20, 2007

(54) MEMBRANE AND SOLENOID ACTUATED VALVE FOR DISPENSING

(75) Inventors: Mark A. King, New Richmond, WI (US); Eugene G. Thury, St. Paul, MN (US); Gregory W. Parkhurst, Brooklyn Park, MN (US); Michael J. Marshik, Circle Pines, MN (US)

(73) Assignee: Graco Minnesota Inc., Minneapolis, MN (US)

(*) Notice: Subject to any disclaimer, the term of this patent is extended or adjusted under 35 U.S.C. 154(b) by 182 days.

(21) Appl. No.: 10/530,692

(22) PCT Filed: Oct. 10, 2003

(86) PCT No.: PCT/US03/32382

§ 371 (c)(1),
(2), (4) Date: Apr. 8, 2005

(87) PCT Pub. No.: WO2004/033064

PCT Pub. Date: Apr. 22, 2004

(65) Prior Publication Data

US 2006/0011652 A1    Jan. 19, 2006

Related U.S. Application Data

(60) Provisional application No. 60/417,720, filed on Oct. 10, 2002.

(51) Int. Cl.
*B67D 5/16* (2006.01)

(52) U.S. Cl. .......................... 222/71; 222/504

(58) Field of Classification Search .............. 222/71, 222/504
See application file for complete search history.

(56) References Cited

U.S. PATENT DOCUMENTS

| | | | |
|---|---|---|---|
| 2,585,821 A | 2/1952 | Mueller | 222/20 |
| 4,955,507 A | 9/1990 | Kirschner et al. | 222/65 |
| 5,257,720 A | 11/1993 | Wulc et al. | 222/20 |
| 5,941,418 A | 8/1999 | Box et al. | 222/71 |
| 5,975,353 A * | 11/1999 | Finlayson | 222/26 |
| 5,979,705 A * | 11/1999 | Kaehler et al. | 222/71 |
| 6,131,768 A * | 10/2000 | Taivalkoski et al. | 222/14 |
| 6,227,227 B1 * | 5/2001 | Poleshuk et al. | 137/98 |

* cited by examiner

*Primary Examiner*—Frederick C. Nicolas
(74) *Attorney, Agent, or Firm*—Douglas B. Farrow

(57) ABSTRACT

The invention replaces mechanical actuation of the valve (22) in lubricant dispense meters (10) to provide a software driven method of controlling the dispense of fluids. The design utilizes either a pressure sensitive membrane switch or a multiple discrete position membrane switch (18) in conjunction with either a multiple discrete stage solenoid actuated valve, a proportional solenoid actuated valve or an on/off solenoid actuated valve (22) to provide operator or programmed control of lubricant dispense frequency and flow rate via the meter's microprocessor.

2 Claims, 1 Drawing Sheet

MEMBRANE AND SOLENOID ACTUATED VALVE FOR DISPENSING

TECHNICAL FIELD

This application claims the benefit of U.S. Application Ser. No. 60/417,720, filed Oct. 10, 2002.

BACKGROUND ART

Meters for dispensing lubricants (oil, transmission fluid) and other related fluids (washer fluid) are well known. Such meters are manufactured by the assignee of the instant invention and a number of others and may simply measure the amount manually dispensed or may operate on a preset basis, that is, the operator enters the desired amount to be dispensed (e.g. five liters), opens the valve and the meter then dispenses the desired amount whereupon it shuts off.

DISCLOSURE OF THE INVENTION

It is an object of this invention to provide a software driven method of controlling the dispense flow rate of lubricants.

The instant invention replaces mechanical actuation of the valve in lubricant dispense meters to provide a software driven method of controlling the dispense of fluids. The design utilizes either a pressure sensitive membrane switch or a multi-position membrane switch in conjunction with either a multistage solenoid actuated valve, a proportional solenoid actuated valve or an on/off solenoid actuated valve to provide operator or programmed control of lubricant dispense frequency and flow rate via the meter's microprocessor.

Use of this technology in the lubrication industry allows for reliable software control of dispense which in turn permits limiting or preventing unauthorized dispense in vehicle service lubricant dispense applications. It also provides total software control of fluid dispense in automatic lubrication applications which today utilize dated timer-controlled, pressure actuated grease injector technology. This technology can be utilized in both on-board and industrial in-plant applications.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
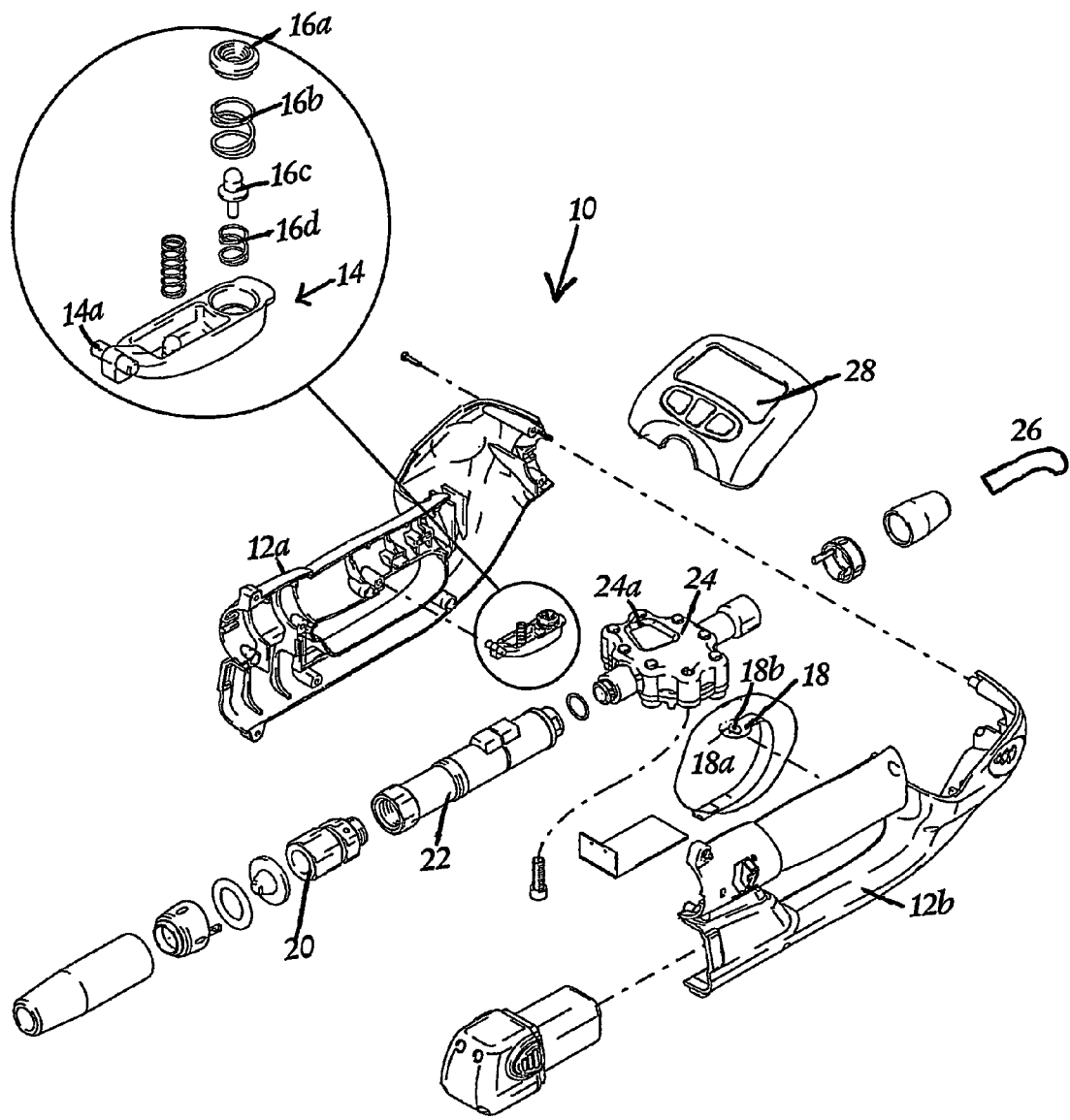
FIG. 1 shows an exploded view of the meter of the instant invention.

The instant invention, generally designated 10, is shown in FIG. 1. A molded plastic housing is comprised of left and right portions 12a and 12b respectively. A trigger 14 moves about a pivot 14a. Trigger plunger assembly 16 is comprised of first plunger 16a, first plunger spring 16b, second plunger 16c and second plunger spring 16d. Trigger plunger assembly 16 is arranged to contact a pressure sensitive membrane switch 18 which has generally concentric first and second contact rings 18a and 18b. In the preferred embodiment, such a switch can be obtained from Golden Valley Products of Minneapolis, Minn. and is a multi-position membrane switch. Switch 18 may also be a pressure sensitive membrane switch.

A source of pressurized lubricant or similar fluid (the term lubricant will be used hereinafter to encompass such similar fluids) is connected to inlet fitting 20 which is in turn connected to solenoid valve 22. Solenoid valve 22 is of the type manufactured by Valcor Scientific of Springfield, N.J. and in the preferred embodiment is a multistage solenoid actuated valve having three positions—off, low and high. Solenoid valve 22 may also be a proportional solenoid actuated valve or an on/off solenoid actuated valve.

A gear meter 24 is connected to the output of solenoid valve 22 and meters the flow through the assembly by virtue of a hall effect transducer 24a which counts the passage of the gear teeth and the flow associated therewith. A dispense nozzle 26 may be attached to the outlet of meter 24. A display and control assembly 28 having microprocessor control and wireless transmission circuitry is provided for operator interaction.

By separating the trigger 14 for the operator to manipulate from the solenoid valve 22, this meter assembly is uniquely suited for use in a centralized controlled lubrication dispensing system such as one might find at an auto dealer service facility. If the meter 10 is used with such a central system and electronically registered with it, the solenoid valve 22 will not be energized to activate until central authorization has taken place. The multi-position pressure sensitive membrane switch 18 and multi-position solenoid valve 22 allow the operator to perform most of a dispense operation at high/full flow while finishing/topping off at a slow rate. If desired, this fast finished with slow sequence may be programmed into the meter software. Alternatively, if it is desired to use the meter without a central system or the central system is down, the meter 10 is fully capable of functioning as a stand-alone preset meter. When used with a pressure sensitive membrane switch and a proportional solenoid actuated valve, the meter may be a fully featherable dispensing device.

It is contemplated that various changes and modifications may be made to the meter without departing from the spirit and scope of the invention as defined by the following claims.

The invention claimed is:

1. A hand-operable fluid dispensing meter comprising:
   a solenoid valve having at least first and second discrete non-zero flow positions;
   a meter for measuring an amount of fluid dispensed by said meter;
   an operator-controlled switch having at least first and second discrete non-zero flow controlling positions; and
   a controller for receiving a position of said switch and operating said solenoid valve accordingly.

2. The fluid dispensing meter of claim 1 further comprising means for receiving dispense authorization from a source external to said meter and allowing a dispense to take place.

\* \* \* \* \*